United States Patent Office 3,322,729
Patented May 30, 1967

3,322,729
METHOD OF MAKING INSOLUBLE POLYMERS OF N-VINYL IMIDES
Frederick Grosser, Midland Park, and Eugene V. Hort and Arthur Schwartz, Metuchen, N.J., assignors to General Aniline & Film Corporation, New York, N.Y., a corporation of Delaware
No Drawing. Filed Oct. 23, 1963, Ser. No. 318,192
10 Claims. (Cl. 260—78)

The present invention relates, in general, to nitrogen-vinyl polymers and, in particular, to insoluble polymers of cyclic N-vinyl imides and methods of making the same.

Nitrogen vinyl polymers and particularly N-vinyl imides of the cyclic types have heretofore been polymerized by a variety of methods. Usually successful polmerization of N-vinyl imides depends to a great extent upon the purity of the starting material. In any event, however, it is known that pure N-vinyl imides polymerize readily under the influence of light, heat or peroxide catalysts, providing, in most cases, high softening polymers which are tough, readily swollen by, and in some instances soluble in, water and rather unstable. For example, Hanford and Stevenson, in U.S. 2,276,840 polymerized N-vinyl succinimide in aqueous suspension with benzoyl peroxide as a catalyst for a period of ten minutes at a temperature of 85° C. to produce a dry granular powder. The poly N-vinyl succinimide was swollen readily by water, acetone or alcohols and was soluble in phenols, dimethyl formamide, dilute mineral acids and organic aliphatic acids. Thus, while the polymers were generally characterized by high softening points making them admirably suited for certain end uses, their water susceptibility and solubility in common organic solvents limited ther usefulness to those areas where water susceptibility and solubility in common organic solvents were not of primary concern. Thus, for example, polymers based on N-vinyl imides which are insoluble would find immediate and general applicability for use as beverage clarifiers, components of filter bed packings, complexing agents, dye receptors and plastic film uses, to name but a few. Thus, it is apparent that a need exists for polymers of N-vinyl imides and methods of producing the same, which are insoluble in common organic solvents and which are not swollen or soluble in water.

Accordingly, it is an object of this invention to provide insoluble polymers of N-vinyl imides.

Another object of this invention resides in the provision of novel methods for producing insoluble polymers of N-vinyl imides.

Yet another object of this invention resides in the provision of insoluble polymers of N-vinyl imides which are not swollen by water and which are not soluble in common organic solvents.

Further objects and advantages of the invention will become further apparent from the following detailed description thereof.

It has now been discovered that the presence of certain amounts of water in the reaction charge prevents runaway reactions; allows the reaction to proceed smoothly at lower temperatures; controls as well as shortens the induction period and, in addition, has a significant effect on the quality and yield of the final product.

The amounts of water which have been found useful in achieving the objects of the invention can vary from as little as 1.0 weight percent and lower to as much as 70 weight percent based on the weight of the N-vinyl imide charged to the reaction vessel. Beneficial results are obtained by employing amounts of water in the range of from 5 weight percent to about 40 weight percent based on the N-vinyl imide and is, therefore, preferred. Either distilled or ordinary fresh water may be used.

The N-vinyl imides which are amenable to the polymerization methods of this invention can be conveniently represented by the following general formula:

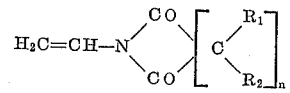

wherein $R_1$ and $R_2$ represent hydrogen and alkyl groups and $n$ represents a whole positive integer of 1 through 4 and wherein all carbons are tetravalent.

Representative N-vinyl imides within the scope of the general formula above which can be employed as starting materials to produce insoluble polymers are set forth in the following Table I:

TABLE I

| $n$ | $R_1$ | $R_2$ | $n$ | $R_1$ | $R_2$ |
|---|---|---|---|---|---|
| 1 | H | H | 3 | $CH_3$ | $CH_3$ |
| 1 | $CH_3$ | H | 3 | $C_2H_5$ | H |
| 1 | $CH_3$ | $CH_3$ | 3 | $C_2H_5$ | $CH_3$ |
| 2 | H | H | 3 | $C_3H_7$ | $C_2H_5$ |
| 2 | $CH_3$ | $CH_3$ | 4 | H | H |
| 2 | $C_2H_5$ | $CH_3$ | 4 | $CH_3$ | $CH_3$ |
| 2 | $C_2H_5$ | H | 4 | H | $CH_3$ |
| 2 | $C_5H_9$ | H | 4 | H | $C_2H_5$ |
| 3 | H | H | 4 | H | $C_3H_7$ |
| 3 | H | $CH_3$ | 4 | $C_3H_7$ | $CH_3$ |

Typical N-vinyl imides which can be employed as starting materials in the methods of the invention include: N-vinyl malonimide; N-vinyl succinimide; N-vinyl glutarimide; N-vinyl maleimide; N-vinyl-β-methylglutarimide; N-vinyl-α-amylsuccinimide; and N-vinyl adipimide.

The classes of catalysts which have been found effective in promoting the polymerization of N-vinyl imides include the oxides, hydroxides and alkoxides of the alkali metals and the alkaline earth metals. Alkali metals and alkaline earth metals which may be mentioned include sodium, potassium, lithium, rubidium, cesium, calcium, magnesium, strontium and barium. Oxides, hydroxides and alkoxides of alkali and alkaline earth metals which function as catalysts for the polymerization system include sodium hydroxide, potassium hydroxide, barium hydroxide, calcium hydroxide, barium oxide, calcium oxide, and the like. Mixtures of oxides or hydroxides of different alkali and alkaline earth metals can also be employed.

The amount of catalyst necessary to effect polymerization of the N-vinyl imide is not necessarily a critical feature of the invention and can be varied over a wide range of from about .05 weight percent to 5.0 weight percent, based on monomer, although amounts above and below this range can be employed if desired. An amount of catalyst of about 1.0 weight percent provides an optimum of reaction rates and reaction times and is therefore preferred.

The polymerization can be effected by heating the N-vinyl imide over a wide range of temperature of from about 40° C. to about 200° C. under subatmospheric, atmospheric or superatmospheric conditions, as desired.

The reaction periods usually will vary considerably depending upon a variety of factors, such as catalyst, catalyst concentration, the temperature employed, and the like. Usually polymerization varies over a period of from one to about three hours. When polymerization does start, it is normally completed within about ten minutes.

In carrying out the methods of the invention, an N-vinyl imide is charged to a reaction vessel equipped with a stirrer, reflux condenser and thermometer. The selected catalyst is charged at the same time or shortly thereafter.

The contents of the reaction vessel are preferably purged with nitrogen gas or any other inert gas and the pressure on the reaction medium reduced and heat applied. Normally the contents of the reaction vessel are preferably agitated with the stirrer and the material maintained at reflux. After polymerization has been initiated the liquid N-vinyl imide will turn to a powder within about ten minutes. The product is then recovered by any conventional means, such as by filtration, whereupon it is washed and dried.

The following examples will serve to further illustrate the practice of the invention with greater particularity although it is to be understood that the invention is not limited thereto.

*Example 1*

To an autoclave were charged 360 grams of N-vinyl succinimide, 3.6 grams of 50% aqueous sodium hydroxide and 38.2 milliliters of distilled water. The charge was heated, under a nitrogen atmosphere, to and maintained at a temperature of 130° C. After two hours, a temperature rise of 5° C. was noted after which the mixture was allowed to cool to 80° C. Water (1500 milliliters) was then added and the mixture heated to and maintained at 100° C. for one hour in order to extract any water solubles. After cooling, the mixture was discharged as a white paste that filtered easily. There was provided insoluble polyvinyl succinimide in a yield of 88.0% of theory.

*Example 2*

To an autoclave were charged 360 grams of N-vinyl succinimide, 10.8 grams of 50% aqueous sodium hydroxide and 34.6 milliliters of distilled water. The charge was heated, under a nitrogen atmosphere, to and maintained at a temperature of 130° C. After one and one-half hours, a temperature rise of 6° C. was noted, after which the mixture was allowed to cool. Water (1500 milliliters) was then added and the mixture heated to and maintained at 100° C. for one hour in order to extract any water solubles. After cooling, the mixture was discharged as a white paste that filtered easily. There was provided insoluble polyvinyl succinimide in a yield of 99.0% of theory.

*Example 3*

To an autoclave were charged 360 grams of N-vinyl succinimide, 5.0 grams of 50% aqueous potassium hydroxide and 51.5 milliliters of distilled water. The charge was heated, under a nitrogen atmosphere, to and maintained at a temperature of 140° C. After three hours, a temperature rise of 7° C. was noted, after which the mixture was allowed to cool to 80° C. Water (1500 milliliters) was then added and the mixture heated to and maintained at 100° C. for one hour in order to extract any water solubles. After cooling, the mixture was discharged as a white paste that filtered easily. There was provided insoluble polyvinyl succinimide in a yield of 90.0% of theory.

While the invention has been described in its various embodiments and specifically illustrated in the examples with respect to certain methods for polymerizing N-vinyl imides and novel catalyst combinations useful therefor in achieving one or more objects of the invention, it is apparent that the invention is not subject to restriction thereto since obvious modifications thereof will occur to persons skilled in the art. Therefore, it is intended that the invention shall include all such modifications and be interpreted as being applicable thereto insofar as the state of the art permits.

What is claimed is:

1. In the method for the production of polymers which are not soluble in water by the polymerization of N-vinyl imides corresponding to the formula:

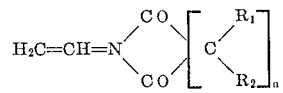

wherein $R_1$ and $R_2$ represent a member of the group consisting of hydrogen and alkyl groups and $n$ represents a whole positive integer of 1 through 4 and wherein all carbon atoms are tetravalent, at an elevated temperature in the presence of a catalyst selected from the group consisting of the oxides and hydroxides of alkali and alkaline earth metals, the improvement in said method which comprises carrying out the polymerization in the presence of water in an amount of from 1.0 to 70 weight percent based on the weight of the N-vinyl imide.

2. The method according to claim 1 wherein the temperature varies from about 40° C. to about 200° C. and wherein water is present in an amount of from about 5 to 40 weight percent based on the weight of the N-vinyl imide.

3. The method according to claim 1 wherein the catalyst is present in an amount of from about 0.05 to 5.0 weight percent based on the imide.

4. The method according to claim 1 wherein the imide is N-vinyl succinimide.

5. The method according to claim 1 wherein the imide is N-vinyl glutarimide.

6. The method according to claim 1 wherein the imide is N-vinyl-β-methylglutarimide.

7. The method according to claim 1 wherein the imide is N-vinyl-α-amylsuccinimide.

8. The method according to claim 1 wherein the imide is N-vinyl adipimide.

9. The method according to claim 1 wherein the catalyst is sodium hydroxide.

10. The method according to claim 1 wherein the catalyst is barium hydroxide.

References Cited

UNITED STATES PATENTS

| | | | |
|---|---|---|---|
| 2,938,017 | 5/1960 | Grosser | 260—78 |
| 2,963,468 | 12/1960 | Cleaver | 260—78 |

FOREIGN PATENTS

| | | |
|---|---|---|
| 868,741 | 10/1941 | France. |
| 881,757 | 11/1961 | Great Britain. |

WILLIAM H. SHORT, *Primary Examiner.*

H. D. ANDERSON, *Assistant Examiner.*